United States Patent [19]

Takao et al.

[11] Patent Number: 4,792,575

[45] Date of Patent: Dec. 20, 1988

[54] METHOD FOR MANUFACTURING POLYURETHANE FOAM

[75] Inventors: Shoji Takao; Hideo Yamashita; Katsuyoshi Suetsugu; Yasunori Toyama; Kazuki Sasaki, all of Yokohama, Japan

[73] Assignee: Imperial Chemical Industries PLC, London, England

[21] Appl. No.: 4,071

[22] Filed: Jan. 16, 1987

[30] Foreign Application Priority Data

Jan. 31, 1986 [JP] Japan .................................. 61-18220

[51] Int. Cl.$^4$ .............................................. C08G 18/30
[52] U.S. Cl. .................................... 521/157; 521/159; 521/160; 521/163; 521/172; 521/174
[58] Field of Search ............... 521/157, 159, 160, 163, 521/172, 174

[56] References Cited

U.S. PATENT DOCUMENTS

| | | | |
|---|---|---|---|
| 4,251,639 | 2/1981 | Jarre et al. | 521/160 |
| 4,261,852 | 4/1981 | Carroll et al. | 521/159 |

*Primary Examiner*—John Kight
*Assistant Examiner*—Samuel A. Acquah
*Attorney, Agent, or Firm*—Cushman, Darby & Cushman

[57] ABSTRACT

A method for manufacturing polyurethane foam by mixing (a) polyisocyanate, (b) polyol, (c) blowing agent, (d) catalyst and, as required (e) surface active agent, filler, or other such additive, the said method being characterized in that the polyisocyanate (a) is a prepolymer with isocyanate end groups produced from a polyester polyol and a blended polyisocyanate component comprising 45-95 weight % of diphenylmethane diisocyanate and 55-5 weight % of a polymethylene polyphenyl polyisocyanate with a functionality of 3 or more.

2 Claims, No Drawings

METHOD FOR MANUFACTURING POLYURETHANE FOAM

The present invention relates to a method of manufacturing flexible polyurethane foam. More specifically, it relates to a method of manufacturing flexible polyurethane foam which is based on diphenylmethane diisocyanate, and has both excellent adhesion to vinyl chloride resin (hereinafter abbreviated to PVC) and improved foam properties.

Flexible polyurethane foams are employed in a wide range of fields such as in vehicles, household furniture, bedding, etc, and foam properties are required which satisfy each such area of application. For example, in the seat cushions for cars, an appropriate degree of solidity, together with good elasticity, tensile properties and a low compression set, etc, are required. Moreover, a headrest, or the like, will be moulded by direct injection into a PVC skin. Hence, in the case of manufacture by the integral moulding method, as well as foam performance itself, adhesion between the foam and PVC is an item of importance.

In the past, with the exception of semirigid foams, flexible polyurethane foams were for the most part based chiefly on tolylene diisocyanate, but tolylene diisocyanate has a comparatively high vapour pressure and an unpleasant odour, and further, reaction with polyols is rather slow. Hence, research to improve this situation has progressed, and attention has been directed to methods in which a polyisocyanate based on diphenylmethane diisocyanate is employed instead of tolylene diisocyanate. For example, in Japanese Laid-Open Publication Nos. 53-51299 (51299-1978) and 57-109820 (109820-1982) it is stated that by using a a polyisocyanate based on diphenylmethane diisocyanate, reaction with the polyol is more rapid, so that in the case of moulding the time up to removal from the mould can be shortened. However, the foam obtained by the above method exhibits poor adhesive strength to normal PVC, so that a primer treatment, or the use of modified PVC, or other such measure, is required.

The present inventors have carried out extensive investigation to enhance the adhesion to PVC retaining the particular advantages of a polyisocyanate based on diphenylmethane diisocyanate, namely low vapour pressure and rapid reaction with polyols, and as a result they have discovered that by using a specified polyisocyanate this objective can be realized. It is on this discovery that the present invention is based.

The present invention relates to a method of manufacturing polyurethane foam mixing (a) polyisocyanate, (b) polyol, (c) blowing agent, (d) catalyst and, as required (e) surface active agent, filler or other such additive, the method being characterized in that the polyisocyanate (a) is a prepolymer with isocyanate end groups produced from a polyester polyol and a blended polyisocyanate component comprising 45-95 wt% of diphenylmethane diisocyanate and 55-5 wt% of a polymethylene polyphenyl polyisocyanate with a functionality of 3 or more.

Polyester polyols, used either alone or along with a polyether polyol, are known materials for producing flexible foams. However, they have various disadvantages. Normally, polyester polyols have poor compatibility with polyether polyols, and when they are blended together the mixture often turns cloudy and separated during storage, and further, hydrolysis readily occurs, so the presence of water must be avoided, and a multicomponent system foaming machine is necessary.

In the present invention, consideration has also been given to such points.

Moreover, it has been discovered that the tensile properties of foam obtained in accordance with the present invention are enhanced in comparison to the case where a prepolymer modified by means of a polyether polyol is employed.

The prepolymer in the present invention can be produced by a normal method known to those skilled in the art. That is to say, the said prepolymer can be obtained by mixing together excess blended polyisocyanate component and the polyester polyol, at normal temperatures or at an elevated temperature, in the presence of a catalyst where necessary, and taking the reaction to completion.

In such circumstances, the entire amount of the prescribed quantity of blended polyisocyanate component may be reacted in one go with the polyester polyol, or diphenylmethane diisocyanate and polyester polyol may first be reacted together, after which the calculated amount of the remaining polyisocyanate component may be mixed in. Alternatively, two or more prepolymers with different isocyanate group contents may be blended.

The proportion of the provided isocyanate-groups/-hydroxyl-groups for the purpose of manufacturing the prepolymer is not specifically restricted, but if the proportion is low, and approaches 1.0, the viscosity of the prepolymer obtained will be raised, whereas if the proportion is too high, then effectiveness as a prepolymer is reduced. Consequently, it will be advantageous that the isocyanate content of the prepolymer obtained lies in the range 15.0-32 wt%, and preferably 20.0-31.0 wt%

The polyisocyanate used in the prepolymer manufacture will contain finally 45-95 wt% of diphenylmethane diisocyanate in total. If the amount is less than 45 wt%, then the tear strength and the elongation of the foam obtained are reduced too much, whereas if it exceeds 95 wt% then the foam stability at the time of blowing will be impaired. It is preferred that the said diphenylmethane diisocyanate contains at least 5 wt% of 2,4'-diphenylmethane diisocyanate. The combined use of 2,4'-diphenylmethane diisocyanate will raise the foam stability at the time of blowing and has the effect of improving the low temperature storage stability of the prepolymer.

The polyester polyols used in the prepolymer manufacture can be obtained by the condensation reaction between one or more than one compound with two or more hydroxyl groups, such as ethylene glycol, diethylene glycol, triethylene glycol, 1,2-propylene glycol, trimethylene glycol, 1,3- or 1,4-butylene glycol, hexamethylene glycol, decamethylene glycol, glycerine, trimethylol propane, pentaerythritol, and sorbitol, etc, plus one or more than one compound with two or more carboxyl groups such as adipic acid, succinic acid, malonic acid, maleic acid, tartaric acid, pimelic acid, sebacic acid, phthalic acid, terephthalic acid, isophthalic acid, and trimellitic acid, etc, or alternatively, a lactone polyester, etc, produced by the ring-opening-polymerization of epsilon-caprolactam, or the like, can be used. However, from a consideration of prepolymer viscosity and storage stability, etc, a copolyester polyol based on two or more alcohols, with an average functional group number of 2–3 and an average molecular weight in the range 1,000–3,000 will be advantageous.

Polyol (b) used in the present invention will be a polyether containing at least two hydroxyl groups, or a polyol blend of such a polyether and some other hydroxyl-group-containing compound. The polyether will have from 2 to 8, preferably 2 to 4 hydroxyl groups, a molecular weight of 1,000 to 10,000, preferably 2,000 to 8,000, and further, at least 30 wt% of the hydroxyl groups will be primary hydroxyl groups.

These polyethers are themselves already known and, for example, they may be prepared by the polymerization of epoxides such as ethylene oxide and, as desired, propylene oxide, butylene oxide, tetrahydrofuran, styrene oxide, epichlorohydrin, individually, or as a mixture, or sequentially, by addition to an initiator such as water, an alcohol, ammonia or an amine. One such polyether or a blend of two or more may be used.

The hydroxyl-group-containing compounds which can be used in the form of a blend with the polyether will be compounds with at least two hydroxyl groups. For example, they may be comparatively high molecular weight polyols such as polyoxyalkylene polyols modified with a vinyl resin or urea resin, or a polybutadiene or polycarbonate, etc, with hydroxyl groups, or they may be low molecular weight compounds which act as chain-extenders or cross-linking agents such as triethanolamine, diethanolamine, diethylene glycol, dipropylene glycol, butylene glycol, trimethylol propane, glycerine, and hexanetriol, etc. Further, as required, an amine compound such as ethylene diamine, 1,3-diaminopropane, hydrazine, tolylene diamine, or diethyl tolylene diamine may also be included.

The blowing agents which can be employed in the present invention may, by way of example, be of two kinds; inert low-boiling solvents and reactive blowing agents. The inert low-boiling solvents will include halogen-substituted alkanes such as methylene chloride, methylene trichloride, trichlorofluoromethane, dichlorodifluoromethane and di-bromo-monofluoromethane, acetone, ethyl acetate, butane, hexane, and heptane, etc, as well as previously dissolved or dispersed $N_2$ gas or air, etc.

The typical example of a reactive blowing agent is water, but this category will include compounds which decompose at a temperature higher than air temperature and produce a gas, such as azo compounds like azobisisobutyronitrile. Such blowing agents can be used singly or in mixtures.

Catalysts which can be used in the present invention are, for example, tertiary amines such as triethylamine, tributylamine, N-methyl morpholine, N-ethyl morpholine, N-coco morpholine (morpholine derived from coconut fatty acid), N,N,N',N'-tetramethyl ethylenediamine, 1,4-diaza-bicyclo(2,2,2)octane, N-methyl-N'-dimethyl-aminoethyl piperazine, N,N-dimethyl benzylamine, bis-(N,N-diethylaminoethyl)adipate, N,N-diethyl benzylamine, bis-(N,N-dimethylaminoethyl)ether, triethanolamine, triiso-propanolamine, N-methyl-diethanolamine and N-ethyldiethanol-amine, or organometallic compounds such as tin(II) acetate, tin(II) octoate, and tin(II) laurate. All the aforesaid catalysts may also be used in the form of mixtures.

It is also possible, depending on the particular requirements, to use various additives known to those skilled in the art, like surfactants such as emulsifiers and foam stabilizers, aging inhibitors such as antioxidants and UV adsorbers, fillers such as calcium carbonate and barium sulphate, flame retardants plasticizers, colouring agents, and fungicides, etc.

In the present invention, the various components will be mixed together and reacted using a conventional mixing device such as a low-pressure foaming machine, high-pressure foaming machine, or spray foaming machine, etc. The isocyanate index will be determined according to the particular intended use of the foam, but it will normally be in the range 70–120, and preferably 90–115.

For the foaming, any known method such as the mould method, slab method, or spray method can be employed. In the case where the mould method is used, a sufficient quantity, or more than sufficient, of the mixed liquid to fill the mould interior with foam is injected into a mould made from steel, aluminium or plastic, etc. The time when release from the mould is possible will differ according to the proportions of the respective components used, the temperature of the components, the mould temperature, and the shape of the mould, etc, but normally it will be less than 5 minutes, and following removal from the mould there will be absolutely no deformation or, if there is, this will only be very slight.

In accordance with the present invention, it is possible to enhance the adhesive strength between the foam and PVC while still maintaining the characteristics of using a polyisocyanate based on diphenylmethane diisocyanate, and further, a foam with outstanding tensile properties is obtained without impairing such characteristics as foam solidity or compression set, and so it is extremely useful as a cushion material, or the like, and can be used in a broad range of applications such as in vehicles, household furniture, and bedding, etc.

Below, the present invention will be explained in detail by means of some examples and comparative examples, but the invention is not to be limited to these examples. Further, unless stated otherwise, any reference to 'parts' and '%' is to be taken to mean 'parts by weight' and 'weight percent' respectively.

COMPARATIVE EXAMPLE 1

Preparation of polyisocyanate (A)

Diphenylmethane diisocyanate containing 15% of the 2,4'-isomer was reacted with a polyether diol (PPG) of molecular weight 2500, and a reaction product with a NCO content of 26% was obtained.

60 parts of this reaction product and 40 parts of the remaining blended polyisocyanate component (a mixture of 40% diphenylmethane diisocyanate and 60% polymethylene polyphenyl polyisocyanate with a functional group number of over 3) were mixed together and a prepolymer with a 28% NCO content was obtained. This prepolymer was taken as polyisocyanate (A).

Foam manufacture

A formulation comprising 100 parts of polyether polyol ($\overline{MW}$=6,000, $\bar{f}$=3.5, EO 15%)

3.0 parts of water 1.0 part of TEDA L-33 (manufactured by the Toyo Soda Mfg. Co.)

0.3 parts of NIAX A-1 (manufactured by the UCC Co.)

0.4 parts of B-4113 (manufactured by the Goldschmit Co.)

63 parts of polyisocyanate (A)

was mixed together and injected into a 400×400×100 mm aluminium mould where reaction and foaming took place. The mould temperature was 45° C., and the time to removal from the mould was 3 minutes. The foam obtained in this way had the following properties.

| | | |
|---|---|---|
| density (core) | Kg/m³ | 48 |
| 25% ILD (JIS K6401) | Kg/200φ | 19 |
| resilience (JIS B1501) | % | 60 |
| compression set (JIS K6401) | % | |
| 50% compression, 70° C. × 22 hr | | 6 |
| 50% compression, 95% RH × 50° C. × 22 hr | | 10 |
| tensile strength (JIS K6301) | Kg/cm² | 0.9 |
| elongation at break (JIS K6301) | % | 85 |
| tear strength (JIS K6301) | Kg/cm | 0.41 |

Using the same formulation, and employing a non-rigid PVC surface material, integral moulding was carried out in a headrest mould. The adhesive strength between the foam and PVC in this product was weak, and they readily separated when rubbed by hand. When the surface where separation had taken place was observed, it was clear that it was at the interface between the PVC and foam where separation had occurred.

EXAMPLE 1

Preparation of polyisocyanate (B)

The polyether diol of molecular weight 2500 used in Comparative Example 1 was replaced by a polyester diol (N-168, OHV45, manufactured by Nippon Polyurethane Ind. Co.), but otherwise a prepolymer with a 28% NCO content was obtained in the same way as in Comparative Example 1. This prepolymer was taken as polyisocyanate (B).

Foam manufacture (formulation and properties)

Instead of polyisocyanate (A) in Comparative Example 1, polyisocyanate (B) was used. Otherwise foam was obtained as in Comparative Example 1 above and had the following properties.

| | | |
|---|---|---|
| density (core) | Kg/m³ | 48 |
| 25% ILD | Kg/200φ | 21 |
| resilience | % | 62 |
| compression set | % | |
| 50% compression, 70° C. × 22 hr | | 5 |
| 50% compression, 95% RH × 50° C. × 22 hr | | 8 |
| tensile strength | Kg/cm² | 1.2 |
| elongation at break | % | 102 |
| tear strength | Kg/cm | 0.57 |

In comparison to Comparative Example 1, the tensile properties were improved.

Further, the adhesive strength between the PVC and foam in an integrally moulded headrest using a PVC surface material was excellent. Even when rubbed by hand there was no separation, and when forcibly peeled apart the foam material itself ruptured.

EXAMPLE 2

Preparation of polyisocyanate (C)

Instead of the polyether diol of molecular weight 2500 in Comparative Example 1, there was used a polyester diol (N-168) and a reaction product with a 23% NCO content obtained. 70 parts of this reaction product and 30 parts of the remaining blended isocyanate component (same composition as in Comparative Example 1) were mixed and a prepolymer of 25% NCO content obtained. This prepolymer was taken as polyisocyanate (C).

Foam manufacture (formulation and poperties)

100 parts of a polyether triol (F-2805, manufactured by ICI)
3.0 parts of water
10 parts of Fluon-11
1.2 parts of TEDA L-33
0.1 parts of NIAX A-1
0.4 parts of B-4113
70 parts of polyisocyanate (C)
were mixed together and a foam obtained in the same way as in Comparative Example 1. This foam had the following properties.

| | | |
|---|---|---|
| density (core) | Kg/m³ | 46 |
| 25% ILD | Kg/2000φ | 19 |
| resilience | % | 57 |
| compression set | % | |
| 50% compression, 70° C. × 22 hr | | 10 |
| tensile strength | Kg/cm² | 1.3 |
| extension at break | % | 130 |
| tear strength | Kg/cm | 0.65 |

The adhesion of this foam to PVC was excellent, and in a test similar to that in Example 1, the foam material ruptured.

EXAMPLE 3

Preparation of polyisocyanate (D)

Reaction was carried out between diphenylmethane diisocyanate with a 20% 2,4'-isomer content and a polyester diol of molecular weight 2000 (N-4042, manufactured by Nippon Polyurethane Ind.), and a reaction product was obtained with a 26% NCO content. 70 parts of this reaction product plus 30 parts of the remaining blended polyisocyanate component (of the same composition as in Comparative Example 1) were mixed together, and a prepolymer with a 27% NCO content obtained. This prepolymer was taken as polyisocyanate (D).

Foam manufacture (formulation and properties)

100 parts of polyether triol (F-2805, manufactured by ICI)
3.0 parts of Fluon-11
1.0 parts of TEDA L-33
0.3 parts of NIAX A-1
0.4 parts of B-4113
64 parts of polyisocyanate (D)
were mixed together, and a foam obtained in the same way as in Comparative Example 1. This foam had the following properties.

| | | |
|---|---|---|
| density (core) | Kg/m³ | 46 |
| 25% ILD | Kg/200φ | 17 |
| resilience | % | 57 |
| compression set (70° C. × 22 hr) | % | 9 |
| tensile strength | Kg/cm² | 1.0 |
| extension at break | % | 126 |
| tear strength | Kg/cm | 0.60 |

This foam showed excellent adhesion to PVC, and in a test similar to that in Example 1 the foam material ruptured.

COMPARATIVE EXAMPLE 2

Instead of the N-4042 used in the prepolymer preparation in Example 3, there was employed a polyoxypropylene diol of molecular weight 2000. Otherwise prepolymer was obtained following the same method as in Example 3, and using this as the polyisocyanate, foam was obtained in the same way as in Example 3. The foam had the following properties.

| density (core) | Kg/m³ | 46 |
| 25% ILD | Kg/200φ | 15 |
| resilience | % | 57 |
| compression set (70° C. × 22 hr) | % | 8 |
| tensile strength | Kg/cm² | 0.8 |
| extension at break | % | 118 |
| tear strength | Kg/cm | 0.52 |

In comparison to Example 3, the tensile properties were inferior in every respect. Further, when the adhesion to PVC was tested in the same way as in Comparative Example 1, separation readily occurred and the manner of separation was the same as in Comparative Example 1.

EXAMPLE 4

Preparation of polyisocyanate (E)

Reaction was carried out between a lactone polyester diol of molecular weight 2000 and a polyisocyanate component (NCO content 31.9%) comprising 73% of diphenylmethane diisocyanate containing 15% of the 2,4'-isomer and 27% of polymethylene polyphenyl polyisocyanate with a functional group number of 3 or more. In this way a prepolymer with a NCO content of 28% was obtained. This prepolymer was taken as polyisocyanate (E).

Foam manufacture (formulation and properties)

When instead of polyisocyanate (A), polyisocyanate (E) was employed, and a foam was obtained otherwise in the same way as in Comparative Example 1, the foam had the following properties.

| density (core) | Kg/m³ | 49 |
| 25% ILD | Kg/200φ | 23 |
| resilience | % | 60 |
| compression set (70° C. × 22 hr) | % | 4 |
| tensile strength | Kg/cm² | 1.1 |
| extension at break | % | 103 |
| tear strength | Kg/cm | 0.54 |

This foam had excellent adhesion to PVC, and when tested as in Example 1, the foam material ruptured.

We claim:

1. In a method for manufacturing polyurethane foam by mixing (a) polyisocyanate, (b) polyol, (c) blowing agent, (d) catalyst and, as required (e) surface active agent, filler, or other such additive, the improvement wherein the polyisocyanate (a) is a prepolymer with isocyanate end groups produced from polyester polyol and a blended polyisocyanate component comprising 45–95 weight % of diphenylmethane diisocyanate and 55–5 weight % of a polymethylene polyphenyl polyisocyanate with a functionality of 3 or more, the use of a polyester polyol rather than polyether polyol in the preparation of said prepolymer providing a polyurethane foam having improved adhesion to vinyl chloride resins.

2. In a method for manufacturing polyurethane foam according to claim 1 wherein the diphenylmethane diisocyanate in the blended polyisocyanate component used in the prepolymer manufacture contains at least 5 weight % of 2,4'-diphenylmethane diisocyanate.

* * * * *